June 7, 1927.
S. GREENHOUSE
1,631,263
PRESSURE OPERABLE VALVE
Filed April 9, 1924
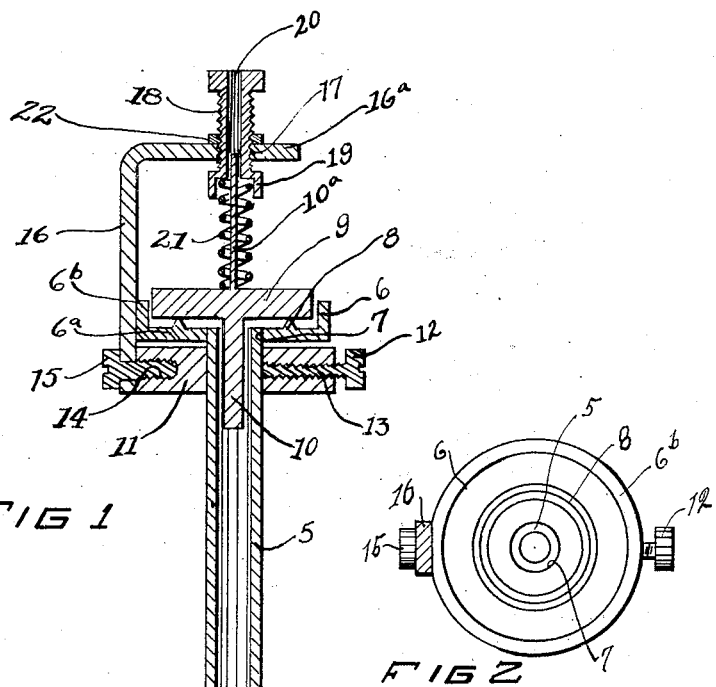
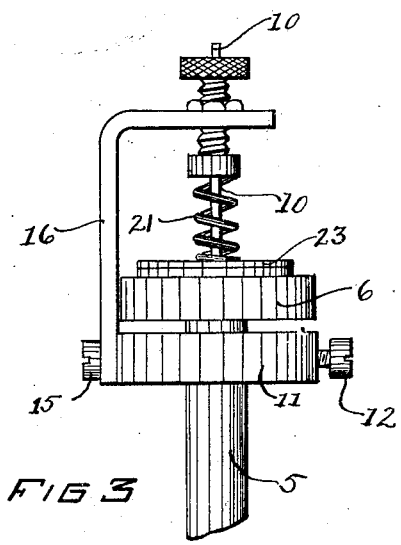
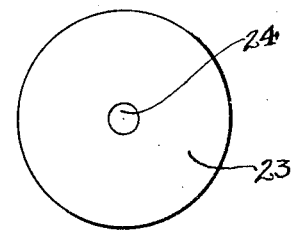

Patented June 7, 1927.

1,631,263

UNITED STATES PATENT OFFICE.

SAMUEL GREENHOUSE, OF AKRON, OHIO.

PRESSURE-OPERABLE VALVE.

Application filed April 9, 1924. Serial No. 705,258.

This invention relates to new and novel improvements in pressure operable valves and has for its object the provision of a valve of simple, durable construction which may be manufactured at a low cost and which may be conveniently and accurately regulated to operate at a predetermined pressure.

While the invention is capable of general application and may be applied to advantage to safety valves, blow-off valves or any valve designed to limit the fluid in a chamber to a certain pressure, it is particularly designed for use in bottling machines on devices of the type set forth and described in my pending application for United States Letters Patent numbered 680,624.

A further object is to provide a pressure operable valve which may be quickly taken apart for the purpose of cleaning, repairing or replacing any of the parts of which it is composed and to provide a combination and arrangement of parts which may be quickly reassembled and accurately adjusted to operate at a certain desired pressure.

The above objects are accomplished and other ends are attained by the novel construction, combination and arrangement of parts hereinafter described and illustrated in the accompanying drawing, wherein I have shown a preferred form of the invention, it being understood that the invention may be adapted in various ways to various uses and that changes and modifications may be made or substitutions resorted to which come within the spirit of the invention as set forth in the appended claims.

In the drawings like numerals of reference are used to denote like parts as the same may appear in any of the several views and in which:—

Figure 1 is a central, vertical, sectional view of a valve constructed in accordance with this invention.

Figure 2 is a plan view of a valve seat employed in carrying out the invention.

Figure 3 is a side elevational view of a valve constructed in accordance with this invention.

Figure 4 is a plan view of one of the weights which may be employed to regulate the device to operate at a certain pressure.

A valve constructed in accordance with this invention comprises a tube 5 having a cup or valve seat 6 secured to the upper end thereof. The cup or valve seat 6 comprises a circular disk $6^a$ having an axially arranged bore 7 which is adapted to snugly receive the upper end of the tube 5. The tube 5 is positioned in said bore 7 with the upper end thereof flush with the upper face of the disk and the said tube is secured in said bore 7 by brazing, soldering or any suitable means. The disk 7 is provided at the outer edge thereof with a circumferentially extending up-standing flange $6^b$. The flange $6^b$ is provided with a concentrically arranged flange 8 which is formed thereon in spaced relation to said bore 7 and in spaced relation to the flange $6^b$. The flange 8 is of triangular cross section and projects upwardly from the upper face of the disk $6^a$. The numeral 9 denotes a flat, cylindrical weight which is adapted to be loosely received in the cup formed by the flange $6^b$, and is adapted to seat on the flange 8 to form a fluid tight joint. The disk 9 is provided with a coaxially arranged downwardly projecting pin 10 which is positioned in the upper end of the bore in the pipe 5 to assist in maintaining the disk 9 in a central position in the cup 6. The disk 9 is likewise provided on the upper face thereof with an upwardly projecting, coaxially arranged pin $10^a$, the purpose of which will be hereinafter described.

The numeral 11 denotes a collar which is in the form of a disk having an axially arranged bore and which is slidably mounted on the pipe 5 at a point below the cup 6. The collar 11 is secured in a fixed position on the pipe 5 by means of a set screw 12 which is operatively threaded in a threaded bore 13 which projects radially into the collar 11, whereby the collar 11 may be selectively moved on the pipe 5 and secured in a fixed position by operating the screw 12. The collar 11 is provided on one side thereof with a radially directed threaded bore 14. An arm 16 is secured to the collar 11 by means of a bolt 15 which is positioned through a suitable bore in the lower end of the arm 16 and is threaded into the bore 14. The arm 16 projects upwardly to a point above the weight 9 and the upper end thereof is bent at a right angle to form a horizontal portion $16^a$ which projects directly over the center of the weight 9. The horizontal portion $16^a$ is provided at a point in axial alinement with the bore of the pipe 5, with the threaded bore 17 in which is mounted a screw 18. The screw 18 is provided with an axial bore 20 and is provided at the lower end thereof with a cup 19. The stem 10ª is entered in the bore 20 and a coil spring 21 is mounted on the stem 10ª with the upper end thereof received in the cup 19 whereby the screw 18 may be operated to compress the spring 21 and cause the same to bear against the weight 9.

The numeral 22 denotes a lock washer which is employed to secure the screw 18 in a fixed position relative to the arm 16ª. The numeral 23 denotes a weight which is in the form of a disk and which is provided with a centrally positioned aperture 24. One or more of the weights 23 may be placed on the weight 9 with the stem 10ª received in the bore 24 to regulate the valve to operate at a certain desired pressure.

While one or more of the weights 23 may be employed, the device may be operated without these weights as shown in Figure 1. Inasmuch as the screw 18 may be operated to compress the spring 21 to regulate the pressure at which the valve will operate, the device may also be regulated by operating the screw 12 and sliding the collar downwardly on the pipe 5, whereupon the screw 12 may be set to hold the collar 11 in a fixed position.

In use, the lower end of the pipe 5 is operatively positioned in the threaded end of the wall of the pressure chamber with the bore of the tube 5 in communication with said chamber. The collar 13 is regulated on the tube 5 to compress the spring 21. The screw 18 is then operated to adjust the compression of the spring 21 to more accurately regulate the device to operate at the desired pressure.

It will be seen that the pin 10ª being entered in the bore 20 in the screw 18 will assist in holding the weight 9 in a central position in the cup 6. If desired, the device may be used without the spring 21 and may be regulated, if necessary, by adding one or more weights 23 in which case the stems 10 and 10ª will hold said weights in a coaxial position on the flange 8 and prevent the same from being thrown from the cup 6 by fluid under pressure escaping through the tube 5.

Having thus illustrated my invention and described the same in detail, what I claim as new and desire to secure by Letters Patent is:—

1. In a device of the class described, a tube, a disk having an axial bore, the upper end of said tube mounted in said bore and secured to said disk; an upstanding, circumferentially extending wall around the outer edge of said disk; an upstanding, annular flange on said disk said flange concentrically arranged between said wall and said tube, a weighted valve positioned on said flange, said valve provided on the upper and lower faces thereof with axially arranged stems, one of said stems positioned in the bore of said tube; a collar slidably mounted on said tube, means operable to secure said collar in a fixed position; an upstanding arm secured to said collar, said arm provided with a horizontal portion which projects over the center of said disk, a screw operatively mounted in said horizontal portion, a cup on the lower end of said screw, a bore through said screw, the stem projecting upwardly from said valve and mounted in said bore and a coil spring mounted on said stem with the upper end thereof received in said cup for compression between said cup and said weight.

2. In a device of the class described, a tube, a shallow cylindrical cup mounted on the upper end thereof, an upstanding, concentrically arranged annular flange on the bottom of said cup, a weighted valve positioned on said flange, said valve provided on the upper and lower faces thereof with axially arranged stems, one of said stems positioned in the bore of said tube; a collar slidably mounted on said tube, means operable to secure said collar in a fixed position, an upstanding arm secured to said collar said arm provided with a horizontal portion which projects over the center of said cup, a screw operatively mounted in said horizontal portion, a cup on the lower end of said screw, a bore through said screw, the stem projecting upwardly from said valve and mounted in said bore, a coil spring mounted on said stem with the upper end thereof received in said cup for compression between said cup and said valve whereby the screw may be operated to regulate the pressure of said spring against said valve.

3. In a device of the class described, a tube, a cup coaxially arranged on the upper end thereof with the cavity of the cup communicating with the bore of the tube, a concentrically arranged annular flange on the bottom of said cup, a weighted valve slidably mounted in said cup and positioned on said flange, said valve provided on each axial face thereof with an axial stem, one of said stems mounted in the bore of said tube, a coil spring mounted in the other stem, an arm, means to secure said arm to said tube, said arm projecting upwardly above said cup and provided with a horizontal portion having a threaded bore, a screw in said bore, said screw having an axial bore, one of said stems slidably mounted in the bore in said screw, said screw engaging the upper end of said spring.

4. In a device of the class described, a tube, a concentrically arranged disk on the upper end thereof, said disk provided with a concentrically arranged up-standing annular valve seat, a weighted valve mounted on said seat, a stem projecting from each axial end of said valve, the downwardly projecting stem positioned in the bore of said tube, a coil spring on the upwardly projecting stem, a collar on said tube, an arm secured to said collar, the upper end of said arm over-hanging said valve and a screw operatively mounted in said arm and engaging the upper end of said spring.

5. In a device of the class described, a tube, a coaxially arranged disk on the upper end thereof, said disk provided with a concentrically arranged up-standing flange forming a valve seat, a weighted valve mounted on said seat, said valve provided on the upper face thereof with an axially arranged stem, a collar secured to said pipe, an arm projecting upwardly from said collar, said arm provided with an angular portion which projects over the center of said weight, said angular portion provided with a threaded bore, said bore being coaxially arranged in relation to said valve, a screw mounted in said bore, an axial bore in said screw, said stem being slidably mounted in said bore.

In testimony whereof I have hereunto set my hand.

SAMUEL GREENHOUSE.